(12) United States Patent
Borthakur et al.

(10) Patent No.: US 9,456,132 B2
(45) Date of Patent: Sep. 27, 2016

(54) IMAGE SENSOR SYSTEM FOR DETECTION AND INFORMATION PROCESSING BASED ON USER PREFERENCES

(71) Applicant: SEMICONDUCTOR COMPONENTS INDUSTRIES, LLC, Phoenix, AZ (US)

(72) Inventors: Swarnal Borthakur, Boise, ID (US); Ulrich Boettiger, Garden City, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 14/577,759

(22) Filed: Dec. 19, 2014

(65) Prior Publication Data

US 2016/0182820 A1    Jun. 23, 2016

(51) Int. Cl.
 *H04N 5/232* (2006.01)
 *G06K 9/46* (2006.01)

(52) U.S. Cl.
 CPC ............ *H04N 5/23229* (2013.01); *G06K 9/46* (2013.01); *H04N 5/23293* (2013.01)

(58) Field of Classification Search
 CPC .................. H04N 5/23229; H04N 5/23293; G06K 9/46
 See application file for complete search history.

(56) References Cited

U.S. PATENT DOCUMENTS

| | | |
|---|---|---|
| 3,125,812 A | 3/1964 | Simpsoo |
| 5,552,780 A | 9/1996 | Knockeart |
| 8,478,126 B1 | 7/2013 | Harres |
| 8,699,887 B1 | 4/2014 | Rothenberg |
| 8,861,974 B2 | 10/2014 | Yamasaki |
| 2007/0046924 A1 | 3/2007 | Chang |
| 2009/0134332 A1 | 5/2009 | Thompson et al. |
| 2010/0317975 A1 | 12/2010 | Yelin et al. |
| 2015/0014417 A1* | 1/2015 | Finlow-Bates ...... G06K 7/1447 235/462.41 |
| 2015/0188632 A1* | 7/2015 | Aoyama .............. H04B 10/116 398/118 |

* cited by examiner

*Primary Examiner* — Nicholas Giles
(74) *Attorney, Agent, or Firm* — Treyz Law Group, P.C.; Zachary D. Hadd

(57) ABSTRACT

A system may include an image sensor having a pixel array that receives light in an environment. The light received at the pixel array may be transmitted by an external device that encodes information using the wavelength, spatial patterning, temporal patterning, or other characteristics of the light. In response to receiving the light, the pixel array may generate electrical signals that are processed to decode the information in the light. The system may compare the decoded information to user preferences to determine if the information is relevant to a user. In response to determining that the information is relevant to the user, the system may display the information to the user, transmit a pulse including user preference information, or change an operating state of the image sensor.

15 Claims, 5 Drawing Sheets

IMAGE SENSOR SYSTEM FOR DETECTION AND INFORMATION PROCESSING BASED ON USER PREFERENCES

BACKGROUND

This relates generally to imaging systems, and more particularly, to imaging systems that detect and process information in an environment.

Modern electronic devices such as cellular telephones, cameras, and computers often use digital image sensors. Imagers (i.e., image sensors) often include a two-dimensional array of image sensing pixels. Each pixel typically includes a photosensor such as a photodiode that receives incident photons (light) and converts the photons into electrical signals.

Image sensors may be used to capture light in a given environment. Light that is captured by an image sensor may generate an electrical signal at a pixel. An electrical signal that is generated by a pixel may be used to present information to a user of an electronic device. For example, electrical signals generated by a pixel may be used to generate a digital image. In some suitable scenarios, electrical signals generated by image sensors may be processed and used to capture information regarding the light that is received at the image sensor, such as brightness, wavelength, spatial patterning, temporal patterning, polarization, direction, and other suitable characteristics that may be associated with light. Such light characteristics may be modified by a light-emitting or reflecting source to encode information based on the characteristics of the light.

In a given environment, a user of an electronic device may be presented with information (such as visual stimulation based on light, for example) relating to any number of a variety of different subjects. For example, a user that is riding in or driving an automobile may be presented with billboards, road signs, and messages presented on surrounding vehicles. Much of the information presented to a user in such an environment may not be relevant to a user, may distract the user, or may not relate to topics or information in which the user is interested at a given time.

It would therefore be desirable to provide image sensors that receive and process information in an environment based on user preferences.

DETAILED DESCRIPTION

Electronic devices and systems such as digital cameras, computers, cellular telephones, and other electronic devices may include image sensors that gather incoming light to capture an image. Electronic devices including imaging systems with image sensors may also be integrated into other systems, such as into vehicles. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
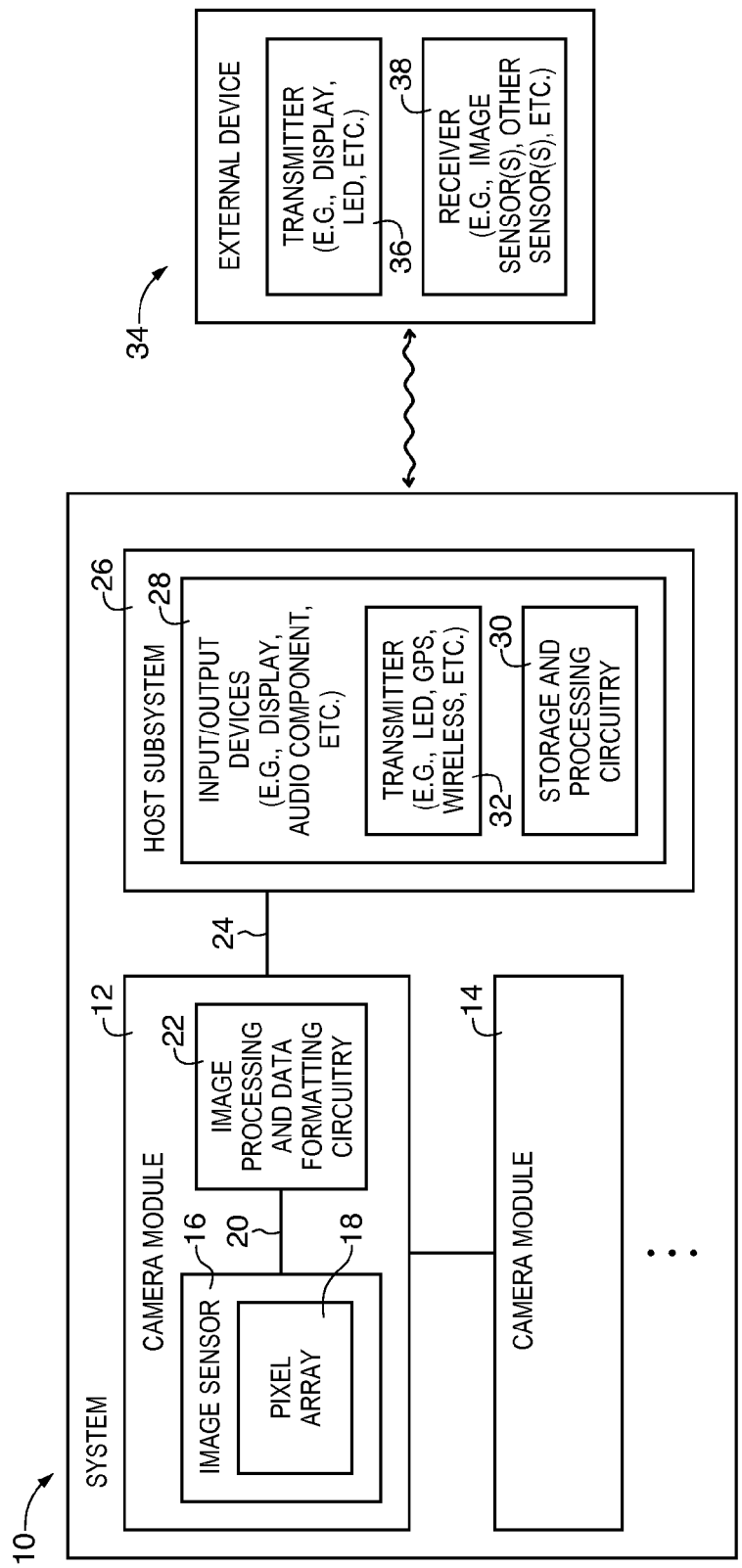
FIG. 1 is a diagram of an illustrative electronic device that may include an image sensor in communication with an external device in accordance with an embodiment of the present invention.

FIG. 1 is a diagram of an illustrative imaging system such as an electronic device or other system that uses an image sensor to capture light in an environment. System 10 (sometimes referred to herein as electronic device 10 or device 10) of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. System 10 may include one or more imaging systems such as camera module 12. Camera module 12 may be used to convert incoming light into digital image data. Camera module 12 may include one or more corresponding image sensors 16. During image capture operations, light from a scene may be focused onto image sensor 16. Image sensor 16 may include an array of pixels such as pixel array 18 (sometimes referred to herein as array 18). If desired, more than one camera module 12 may be provided in system 10, such as additional camera module 14. For example, system 10 may be provided with two, three, four, or more additional camera modules 14, each of which may contain an image sensor 16 and a pixel array 18. Each of camera modules 12 and additional camera modules 14 may contain pixel arrays 18 having the same or different types of pixels. For example, camera module 12 may include pixels of a first type that are configured to detect light having a certain wavelength, intensity, polarization, or other characteristic, and additional camera module 14 may include pixels of a second type that are configured to detect light having a different wavelength, intensity, polarization, or other characteristic. This, however, is merely illustrative. Any combination of pixels configured to detect the same or different characteristics of light may be included in any combination of camera modules 12 and additional camera modules 14.

Pixels such as pixels included in pixel array 18 may be configured to detect different characteristics of the light that is received by the pixels in pixel array 18. For example, pixel array 18 may include pixels that are configured to detect the wavelength and intensity of light (i.e., visible light) that is captured at pixel array 18 by image sensor 16. Pixel array 18 may include pixels that are configured to detect light that is outside the visible spectrum (e.g., light having a wavelength in the infrared or ultraviolet spectrum). If desired, pixel array 18 may also include pixels that are configured to detect other characteristics of light, such as the direction in which the light is traveling or the polarization state of the light. Pixel array 18 may include one, two, three, or more different types of pixels. Pixel array 18 may be entirely made up of one pixel type (e.g., every pixel in pixel array 18 may be substantially the same), or pixel array 18 may be made up of more than one pixel type. If desired, the different types of pixels included in pixel array 18 may be formed in a pattern or specific arrangement. For example, one type of pixel in pixel array 18 may be arranged in a central portion of the pixel array 18, while a second type of pixel that is configured to detect light having a certain characteristics (e.g., light having a wavelength in the infrared or ultraviolet spectrum) may be formed around the central portion in a border region of pixel array 18. This, however, is merely illustrative. Any combination of pixels configured to detect any combination of characteristics of light may be arranged in any suitable combination or pattern in a pixel array 18.

Pixels in pixel array 18 may generate image signals in response to receiving light from a scene. For example, pixels in array 18 may include photosensitive elements such as photodiodes that convert incoming light into electric charge. Image pixels in pixel array 18 may be connected to image processing and data formatting circuitry 22 (sometimes referred to herein as data formatting circuitry 22 or decoding circuitry 22) via path 20, which may control image sensor 16 and the pixels of pixel array 18 contained therein. Image processing and data formatting circuitry 22 may include circuitry for converting analog image signals into corresponding digital image pixel data (e.g., a respective pixel value generated by each image sensor pixel). Pixel values generated by pixel array 18 and image processing and data formatting circuitry 22 may be transmitted via path 24 to components of host subsystem 26 such as input/output devices 28 and storage and processing circuitry 30.

Storage and processing circuitry 30 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within camera module 12 that is associated with image sensors 16). Storage and processing circuitry 30 may include volatile and non-volatile memory (e.g., random-access memory, flash memory, hard drives, solid state drives, etc.). Storage and processing circuitry 30 may also include processors such as microprocessors, microcontrollers, digital signal processors, application specific integrated circuits, etc. Image data that has been captured by camera module 12 may be processed and stored using storage and processing circuitry 30 (e.g., using an image processing engine on processing circuitry 30, using an imaging mode selection engine on processing circuitry 30, etc.). Processed image data may, if desired, be provided to external equipment (e.g., a computer, external display, or other device) using wired and/or wireless communications paths coupled to processing circuitry 30. For example, image data processed by storage and processing circuitry 30 may be displayed to a user using input/output devices 28, or may be stored on system 10 using storage circuitry included in host subsystem 26.

Host subsystem 26 may include input/output devices 28 such as projectors, keypads, input-output ports, and displays. Input/output devices 28 may include a display that presents information to a user of an electronic device that includes system 10. In one illustrative example, host subsystem 26 may include input/output devices 28 that include a transmitter 32. Transmitter 32 may be any device or component suitable to transmit a signal. For example, transmitter 32 may include a light source, an audio source, or a component that generates a signal at a specific radio or other frequency. Transmitter 32 may be a device that generates wireless signals over wireless communications paths. For example, system 10 may contain wireless communications circuitry that operates in long-range communications bands such as cellular telephone bands and wireless circuitry that operates in short-range communications bands such as the 2.4 GHz Bluetooth® band and the 2.4 GHz and 5 GHz WiFi® wireless local area network bands (sometimes referred to as IEEE 802.11 bands or wireless local area network communications bands). System 10 may also contain wireless communications circuitry for implementing near-field communications, communications at 60 GHz, light-based wireless communications, satellite navigation system communications, or other wireless communications. In one exemplary scenario, transmitter 32 may be a light source such as an LED that emits light at a frequency or multiple frequencies.

Electronic devices having image sensors such as a camera module 12 and host subsystem 26 including input/output devices 28 such as transmitter 32 may communicate with other devices (e.g., other electronic devices) in an environment. In one illustrative example, system 10 may communicate with another device such as external device 34. External device 34 may be any suitable electronic device such as a computer, a cellular telephone, a music or video player, a television, a monitor, a digital camera or other imaging device, a transmitter, a receiver, or any electronic device capable of communicating with an electronic device or presenting information in an environment.

In one illustrative example, external device 34 is an electronic device that includes a transmitter 36 and a receiver 38. Transmitter 36 may be any device or component suitable to transmit a signal. For example, transmitter 36 may include a light source, an audio source, and/or a component that generates a signal at a specific radio or other frequency. Transmitter 36 may be a device that generates wireless signals over wireless internet networks, satellite networks, cellular telephone networks, global positioning system networks, local area networks, or other networks suitable for the transmission of data and information. Transmitter 36 may contain wireless communications circuitry that operates in long-range communications bands such as cellular telephone bands and wireless circuitry that operates in short-range communications bands such as the 2.4 GHz Bluetooth® band and the 2.4 GHz and 5 GHz WiFi® wireless local area network bands (sometimes referred to as IEEE 802.11 bands or wireless local area network communications bands). System 10 may also contain wireless communications circuitry for implementing near-field communications, communications at 60 GHz, light-based wireless communications, satellite navigation system communications, or other wireless communications. In one suitable example, transmitter 36 may be a light source that generates light at a wavelength or multiple wavelengths. For example, transmitter 36 may generate light at an infrared wavelength. The light generated by transmitter 36 may provide information. For example, light generated by transmitter 36 may encode information based on the spatial pattern of the light generated by transmitter 36 (e.g., an image or other arrangement of light), the temporal distribution of the light generated by transmitter 36 (e.g., the frequency and/or pattern with which transmitter 36 generates one or multiple different signals), the frequency, brightness, polarization, or any other suitable characteristic of the light that is generated by transmitter 36, or in any other suitable manner. In one suitable embodiment, transmitter 36 may generate light that encodes information that is transmitted into an environment in which external device 34 is present.

External device 34 may also include a receiver 38. Receiver 38 may be any suitable component or apparatus configured to receive information or a signal. For example, receiver 38 may be an antenna configured to receive radio or other waves, a receiver of wireless transmissions that may be made over wireless or local area networks, satellite networks, or global positioning system networks, and/or a sensor that may receive signals generated from any suitable transmitter (for example, transmitter 32) such as a transmitter that generates light, audio, radio, wireless, or other signals. In one illustrative example, receiver 38 may include an image sensor such as image sensor 16 that may capture light that is present in the environment in which external device 34 is present. External device 34 may be able to capture light and information that may be provided by or encoded with the light in an environment.

System 10 and external device 34 may communicate with one another in a given environment. For example, when system 10 and external device 34 are in the same local environment (e.g., in relatively close spatial proximity to one another), system 10 and device 34 may exchange information. In one illustrative example, transmitter 36 of external device 34 may generate a signal. The signal generated by transmitter 36 may include light that is produced by a component such as a display, laser, lamp, light-emitting diode (LED), or other suitable light-generating component in transmitter 36. In one illustrative example, transmitter 36 includes one or more LEDs configured to generate light at a wavelength or multiple wavelengths. Transmitter 36 may generate light in a spatial pattern (e.g., transmitter 36 may generate light that produces an image using multiple light sources such as multiple LEDs or a display). Transmitter 36 may generate light having a temporal distribution (e.g., transmitter 36 may generate light at intervals or in pulses, or may generate light constantly at some times and may not generate light at other times). Transmitter 36 may also generate light having other configurations or characteristics, such as different wavelengths, spatial and temporal arrangements, polarization states, directions, and other suitable configurations. Transmitter 36 may produce light having characteristics and configurations that encode information using the light that it produces. For example, transmitter 36 may generate light that provides information when the light is received and processed at a suitable receiver. This, however, is merely illustrative. Transmitter 36 may generate any suitable transmission or signal of any type that may include any type of information.

During communication between system 10 and external device 34, system 10 may receive information that is transmitted by external device 34. For example, system 10 may include a camera module 12 including image pixel array 18 in image sensor 16 with which system 10 may be capable of receiving light. In one illustrative example in which system 10 receives information such as light that is generated by transmitter 36 of external device 34, image sensor 16 may receive the light at pixel array 18. Pixel array 18 may contain pixels that are configured to generate an electrical signal in response to light that is received thereon. Pixels in pixel array 18 may contain any suitable number or type of pixels. For example, pixel array 18 may include pixels configured to detect the wavelength, polarization, direction, intensity, or any other suitable characteristics of light. Pixel array 18 may include multiple different pixel types that detect the same or different characteristics of light, and may include different types of pixels arranged in any suitable pattern or configuration. Light may also be received at an additional camera module 14, which may include an additional pixel array 18 that is also configured to receive light. Pixel array 18 may be configured to receive light having similar or different characteristics to the light that pixel array 18 in camera module 12 is configured to receive. For example, a pixel array 18 in additional camera module 14 may receive light having a certain non-visible wavelength (e.g., light having a wavelength or wavelengths corresponding to the infrared spectrum), while a pixel array 18 in camera module 12 may be configured to detect light in the visible spectrum. In one suitable scenario, system 10 may include only one camera module 12 that may include a pixel array having pixels of various different types (for example, pixels that detect light in the visible spectrum, and pixels that detect light having a wavelength outside of the visible spectrum). This, however, is merely illustrative. System 10 may be provided with any suitable number and configuration of camera modules 12 having any suitable number and arrangement of pixel arrays 18 with any suitable number of pixels configured to detect similar or different characteristics of light arranged in any desired configuration.

Upon receiving light transmitted by external device 34, pixels in pixel array 18 may generate electrical signals. The electrical signals generated by pixels in pixel array 18 provide information about the light that is received at pixel array 18. In one suitable example in which the light that is received at pixel array 18 is light that was generated by transmitter 36 of external device 34, pixels in pixel array 18 may generate electrical signals that represent information that may be encoded with the light generated by transmitter 36. For example, pixel array 18 may generate electrical signals that indicate that the light received at pixel array 18 includes light of a certain wavelength, light in a spatial or temporal pattern or arrangement, light having a certain polarization state, or any other characteristic that may be used to encode information in the light generated by transmitter 36. In one illustrative example, image sensor 16 may transmit these electrical signals to image processing and data formatting circuitry 22. Data formatting circuitry 22 may process the electrical signals generated by pixels in pixel array 18 and may decode the information encoded in the light generated by transmitter 36. After processing the electrical signals, data formatting circuitry 22 may transmit data relating to the information included in the light transmitted by transmitter 36 to other components of system 10, such as host subsystem 26. Such information may be received at storage and processing circuitry 30, where the information may be stored or processed.

In one suitable example, storage and processing circuitry 30 may process the information received from camera module 12 to determine if the information encoded in the light received from transmitter 36 includes certain information. For example, storage and processing circuitry 30 may process the information to determine if the information matches with preferences of a user of system 10 based on user preference settings or a user profile. User preference settings and/or a user profile may be entered by a user of system 10 manually (e.g., may be entered using an input/output device 28 such as a display), or may be automatically generated by system 10. For example, system 10 may track locations at which a user frequently visits, times at which a user uses system 10, the type, content, frequency, and other characteristics of information viewed by a user using system 10, or may store and process any other suitable information relating to the use of system 10 by a user. System 10 may use such information to generate user preferences or a user profile that represents goods and/or services a user is likely to want, locations a user is likely to visit, entertainment a user is likely to enjoy, advertisements that are relevant to a user, or any other suitable preference that a user of system 10 may have. A user profile or user preferences may be stored and/or processed at storage and processing circuitry 30, using any other suitable component of system 10, or using storage and processing circuitry that is included in a device that is not a part of system 10.

Based on the processing of the information received from external device 34 and user preferences and/or a user profile, storage and processing circuitry 30 may communicate with other components of host subsystem 26 or camera module 12. For example, in response to processing that determines that the information received from transmitter 36 does match a user preference profile, storage and processing circuitry 30 may transmit the information to an input/output device such as a display so that the information can be displayed to a user. In one suitable example, input/output devices may include a speaker that is configured to present the information processed by storage and processing circuitry 30 to a user using audible signals. In one exemplary scenario, storage and processing circuitry 30 may generate signals that are transmitted to an input/output device 28 such as a display, which may then provide a visual representation of the information to a user.

Storage and processing circuitry 30 may also communicate with a transmitter of host subsystem 26 such as transmitter 32. In response to the information received from transmitter 36, storage and processing circuitry 30 may communicate with transmitter 32 in a manner that causes it to begin or cease transmitting a signal. For example, in response to receiving information from external device 34 that matches a user preference profile, storage and processing circuitry 30 may cause transmitter 32 to transmit a signal. Such a transmitted signal may be received at an external device 34 (at, for example, receiver 38). In one suitable example, storage and processing circuitry may communicate with camera module 12 based on the information received from transmitter 36 of external device 34. For example, if the information received from transmitter 36 matches a user preference, storage and processing circuitry may cause camera module 12 to continue capturing light in a given environment, or may cause camera module 12 to change to a different mode of operation in which camera module 12 may capture light in a different manner or using different components (e.g., camera module 12 may activate or deactivate one or more pixels or pixel arrays 18, or may activate or deactivate one or of more camera modules 12 and/or 14). In one exemplary scenario, storage and processing circuitry 30 may determine that the information transmitted by transmitter 36 does not match a user preference or interest, and may communicate with camera module 12 or input/output devices 28 such that camera module 12 and input/output devices 28 change their operating mode to no longer capture light or to no longer generate and/or transmit a signal.

In one illustrative example, host subsystem 26 of system 10 may also include a transmitter 32 that is configured to transmit a signal. In the illustrative example of FIG. 1, transmitter 32 may transmit a signal in the form of a wireless or other signal (a signal that is based on light, for example). Any suitable information may be transmitted by transmitter 32. In one suitable example, transmitter 32 transmits information relating to the preferences of a user, based on, for example, a user profile that may be stored in storage and processing circuitry 30. A user profile may contain any suitable information, such as, for example, goods and services that are of interest to a user, offers that are relevant to a user, a user's preferences in terms of food, entertainment, activities, music, or other goods and services. In one suitable scenario, transmitter 32 may generate a signal that is indicative of user preferences based on a user profile such that suitable receivers (e.g., receiver 38 of external device 34) in the environment may receive the signal. For example, in the illustrative example of FIG. 1, transmitter 32 may generate a signal in the form of light that is indicative of the preferences of a user (using spatial and temporal encoding, for example). In such a scenario, a receiver (such as receiver 38 of external device 34, for example), may receive a signal transmitted by transmitter 32 of system 10. Upon receiving the signal from transmitter 32, external device may process the signal and determine whether or not the information generated by external device 34 is relevant to the user's preferences based on the signal generated by the transmitter 32. In the event that the information generated by external device 34 is relevant, external device 34 may generate a transmission including information that is relevant to the user using transmitter 36 to be received by system 10 (at, for example, camera module 12). In the event that the information generated by external device 34 is not relevant to a user's interests, external device 34 may not transmit a signal.

In one suitable example, transmitter 32 of host subsystem 26 may also transmit information that the information available in a given environment is not relevant to a user's preferences. For example, in response to receiving information from external device 34 that is not relevant to a user's interests, transmitter 32 may transmit a message that indicates that the information received from external device 34 is irrelevant to a user. In response to receiving such a transmission from system 10, external device 34 may cease transmitting information to system 10.

Image systems having image sensors may also be components of a larger system, such as a system in a vehicle such as a car, automobile, truck, sports utility vehicle, airplane, boat, helicopter, motorcycle, or other suitable vehicle. In such a system, an imaging system having an image sensor may be used to capture and process information based on light or other suitable signals or transmissions in an environment.

Figure 2:
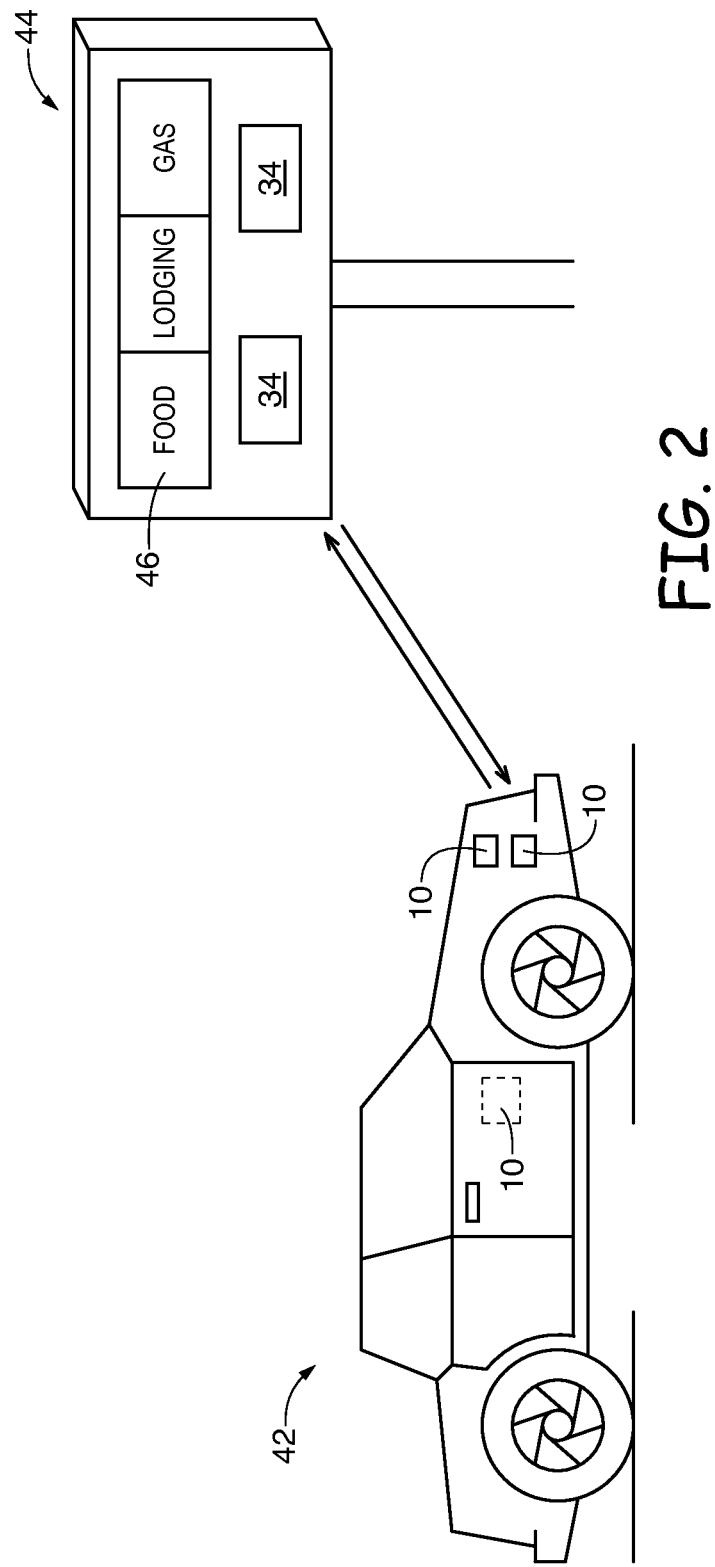
FIG. 2 is diagram of an illustrative environment including an information source that may present information to a user and that may be in communication with an illustrative electronic device in accordance with an embodiment of the present invention.

A suitable environment in which system 10 having a camera module 12 may be incorporated into a larger system is shown in FIG. 2. In the example of FIG. 2, one or more systems 10 may be incorporated in to a larger system such as vehicle 42. In the example of FIG. 2, vehicle 42 is an automobile. This, however, is merely illustrative. A vehicle 42 into which a system 10 may be incorporated may include a car, truck, sport utility vehicle, boat, helicopter, airplane, bicycle, motorcycle, or any other suitable vehicle. In some suitable scenarios, system 10 may be incorporated into a larger system other than a vehicle 42. For example, system 10 may be incorporated into any suitable electronic device such as a telephone, music player, video player, or other electronic device, into an appliance such as a home or other appliance, or into any suitable device or apparatus configured to provide information such as a billboard, a display, a sign, or other means for providing and/or receiving information.

In the illustrative example of FIG. 2, additional devices that may transmit or receive information such as external device 34 may be present in the environment. For example, an external device may be incorporated into a larger system, such as a sign 44. This, however, is merely illustrative. External device 34 may be incorporated into any suitable device or component that is capable of receiving or transmitting information, such as a billboard, a display, a sign, a surface of a vehicle, a building or other construction, on or within another electronic device, or in/on any suitable apparatus from which an external device 34 may receive and/or transmit information. Sign 44 may also include information such as information 46. In the illustrative example of FIG. 2, information 46 may include advertisements or other information relating to goods or services that may be available to a user in an environment. For example information 46 may include words, phrases, illustrations, images, or other forms of visual stimulation that alert a user that goods and services such as food, gasoline, and lodging are available nearby. In such a scenario, external devices 34 may provide information (e.g., information in addition to the information 46 that is visible to a user) that indicates the availability of such goods and services nearby. For example, in the illustrative example of FIG. 2, an external device 34 may transmit information (from for example, transmitter 36) that indicates the availability of goods or services nearby. As described above in connection with FIG. 1, external device 34 may transmit such information as light that encodes the information based on the wavelength, intensity, spatial or temporal patterning, or other characteristics of the light. In one suitable example, external device 34 may transmit such information in the form of light that is generated by transmitter 36 and is received by a system 10 that is incorporated into, for example, vehicle 42. In such an example, system 10 may be a discrete unit that has been incorporated into vehicle 42, or may be integrated with other systems in vehicle 42. In one suitable arrangement, components of system 10 such as camera module 12 may positioned in one portion of vehicle 42 (such, for example, a front portion of vehicle 42 at which light or information in the environment may be received), while other portions of system 10 (such as, for example, host subsystem 26) may be incorporated into other portions of vehicle 42 (e.g., into an on-board or other computer, or into a dashboard or other interior component of vehicle 42). This, however, is merely illustrative. System 10 may be incorporated into any suitable larger system in any suitable configuration or arrangement, in any locations and divided into any suitable number of separate components.

In the illustrative example of FIG. 2, external device 34 may generate a signal in the form of light using transmitter 36. The signal generated by external device 34 may provide information relating to the information 46 provided as a visual representation on sign 44. When external device 34 generates the signal, a nearby system such as system 10 may receive the signal. As described above in connection with FIG. 1, a pixel array 18 in image sensor 16 may receive the light generated by external device 34, and may convert the light that is received into an electrical signal. Components of system 10 such as decoding circuitry 22 and host subsystem 26 may then process the electrical signals to determine the information that is encoded in the light signal generated by external device 34.

In one suitable example, system 10 may be configured to receive and process information 46 in the form of visible light. For example, system 10 may include a camera module 12 that is configured to capture light in the visible spectrum (i.e., camera module 12 may capture the same image including information 46 that is seen by a user) and may include pixels in a pixel array 18 that generated electrical signals in response to the visible light that is received at camera module 12. A system 10 that captures visible light including information 46 from sign 44 may process such electrical signals in the same manner as if the light received were an infrared signal (or any other suitable signal) transmitted by external device 34 (using, for example, data formatting circuitry 22 and/or storage and processing circuitry 30) to determine the content and information included in the images or text displayed as information 46. In one illustrative example, system 10 may capture an image that includes text. The image of the text may be processed by data formatting circuitry 22 and/or storage and processing circuitry 30 to determine if the information that is included in the text is relevant to a user (e.g., matches a user profile).

Upon determining whether or not the information is relevant to a user (for example, a user that is driving in vehicle 42) based on known user preferences, system 10 may present the information to the user. For example, system 10 may present the information to the user using an input/output device such as a display that is on the inside of vehicle 42. System 10 may present to the user a reproduction of the light that was captured (e.g., a visible image or text on a billboard or sign) and/or may present to the user information that was encoded in the light that was captured (e.g., information encoded in an infrared or other signal). In one suitable example, the information processed by storage and processing circuitry 30 (or other suitable processing components of system 10) may determine that the information that is transmitted by external device 34 is not relevant to a user (because, for example, the information does not match user preferences that may be input by a user at system 10 and may be stored, for example, and storage and processing circuitry 30). In such an example, system 10 may take no action and may not display the information to the user, or may change the function of components in system 10 (such as camera module 12 or input/output devices 28) based on the lack of relevant information available to the user in an environment.

Figure 3:
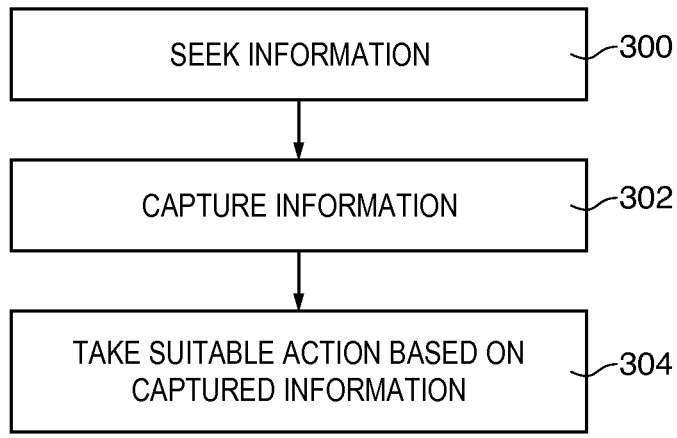
FIG. 3 is a flow chart of illustrative steps that may be performed by an electronic device having an image sensor based on information that is present in an environment in accordance with an embodiment of the present invention.

FIG. 3 is a flow chart of illustrative steps that may be performed by a system 10 of FIG. 1 in an environment in which information relating to a user's preferences may be present.

At step 300, system 10 may seek information based on a user's preferences (such as, for example, a user preference profile that is stored in storage and processing circuitry 30). System 10 may transmit signals using transmitter 32 that provide information relating to the preferences of a user. The signal transmitted by transmitter 32 may be any suitable signal (e.g., the signal may take the form of an infrared transmission). Such a signal may be received by devices in an environment such as external device 34 that may provide information in an environment.

At step 302, system 10 may capture information that is present in an environment. System 10 may capture all information that is present in the environment (e.g., signals or transmissions generated by an external device 34). In one illustrative example, system 10 may capture information that is transmitted in the environment in response to the transmission by system 10 relating to the preferences of the user. In such an illustrative example, only information relevant to the preferences of a user may be transmitted by external devices 34 into the environment, and therefore only information relevant to a user or that matches a user's preferences may be captured by system 10 (using, for example, image sensor 16). In one suitable example, camera module 12 may capture a transmission from an external device 34 in the form of infrared light. Pixel array 18 may contain pixels that generate an electrical signal in response to the light received at the pixel array 18, and therefore may generate an electrical signal that can be processed by processing circuitry 22 and/or storage and processing circuitry 30.

At step 304, system 10 may take suitable action based on the information that is captured by camera module 12 and processed by circuitry such as storage and processing circuitry 30. For example, if the transmission received at camera module 12 included information relevant to a user (for example, the information provided by external device 34 matches the preferences of a user), system 10 may present the information to the user (on, for example, an input/output device such as a display). If, however, the information is not relevant to a user, system 10 may not present the information to a user, or system 10 may generate a signal (using, for example, transmitter 32) that indicates that the information present in the environment is not relevant to a user's interests, which may cause external devices 34 to no longer transmit signals to system 10, or may cause external devices 34 to transmit signals including different information into the environment.

Figure 4:
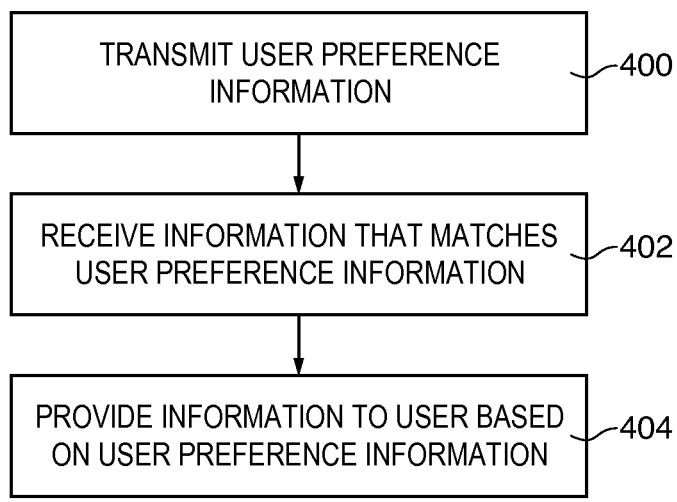
FIG. 4 is a flow chart of illustrative steps that may be performed by an electronic device that transmits and receives information in an environment and that presents information to a user in accordance with an embodiment of the present invention.

FIG. 4 is a flow chart of illustrative steps that may be performed by a system 10 of FIG. 1 to transmit and receive information relating to a user's preferences. A system 10 may perform the illustrative steps of FIG. 4 while operating in a "stealth" mode in which the system actively transmits information relating to the user's preferences and receives information that is relevant to the user's preferences based on signals in the environment.

At step 400, system 10 may transmit information relating to a user's preferences (e.g., user preference information in the form of a user profile). System 10 may transmit user preferences stored in storage and processing circuitry 30 using transmitter 32. For example, transmitter 32 may transmit a signal in the form of spatially and temporally encoded infrared light signals that provide information relating to the preferences of a user. In one illustrative example, a user may be interested in booking a room at a hotel. Transmitter 32 may then transmit a signal that indicates that the user is interested in booking a room at a hotel into the environment. Such a signal may then be received at an external device 34, such as an external device 34 on a sign 44. If external device 34 is capable of sending a signal that is relevant to a user's preferences (e.g., if external device 34 is on a billboard or sign 44 that advertises a nearby hotel), external device 34 may be configured to generate and transmit signals that provide information about a hotel such as availability and cost per night to be received at system 10.

At step 402, system 10 may receive information that matches user preference information. Because system 10 is transmitting information that indicates the preferences of a user, only external devices 34 that are capable of presenting information that is relevant to the interests of a user may produce signals in the environment to be received at device 10. In such an example, system 10 may only receive information that is relevant to the preferences of the user. System 10 may receive information in the form of light at camera module 12, which may produce electrical signals based on the light that is received (using, for example, pixels in pixel array 18). The electrical signals produced may be processed by image processing and data formatting circuitry 22 and/storage and processing circuitry 30.

At step 404, system 10 may provide information to the user based on the received and processed information, and by using user preference information. For example, system 10 may process the information received from external devices 34, and may determine which information is most relevant to a user's preferences. System 10 may then present such information to a user (e.g., as a single relevant option, or as multiple options that are all relevant to a user's preferences, from which a user may select the most relevant). In one illustrative example, system 10 may select a most relevant option, and perform further processing (using storage and processing circuitry 30, for example) to present additional information to a user. In the illustrative example in which a user is interested in booking a hotel room, system 10 may process the received information to determine the hotel that most closely matches the user's preferences, and then provide information to the user regarding the hotel (e.g., system 10 may provide directions based on GPS navigation or other suitable means for providing instructions on how to get to the hotel). In this way, a user may be presented with specific information that is relevant to the user's interests without having to provide any input other than user preference information (which may be entered by a user ahead of time, or may be established over time based on information about a user that may be gathered by system 10).

Figure 5:
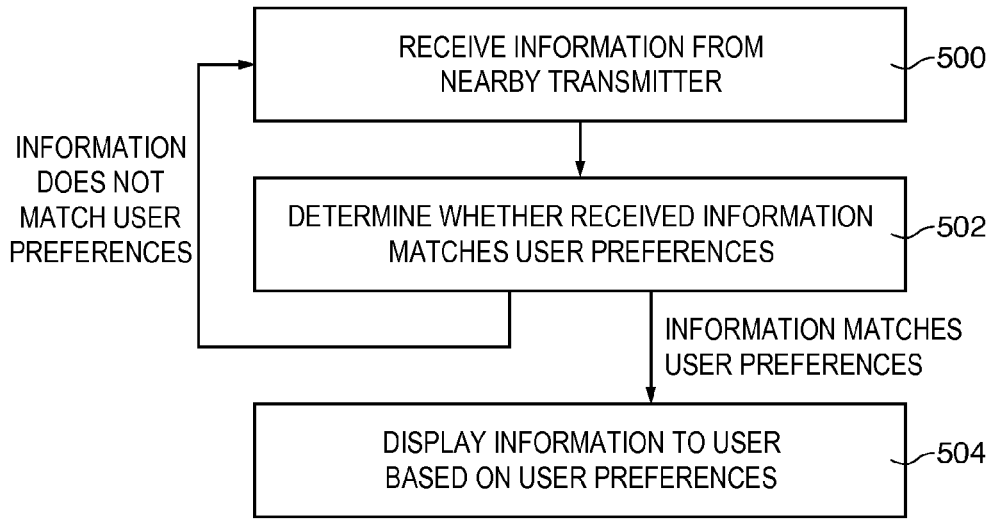
FIG. 5 is a flow chart of illustrative steps that may be performed by an electronic device having an image sensor that receives and processes information in an environment and provides information to a user in accordance with an embodiment of the present invention.

FIG. 5 is a flow chart of illustrative steps that may be performed by a system 10 of FIG. 1 to receive information and present information to a user that is relevant to the user's preferences. A system 10 may perform the illustrative steps of FIG. 5 while operating in a "privacy" mode in which the system does not transmit any information relating to a user's preferences. In such an example, system 10 may receive all signals in an environment and process them in order to provide to a user with information that matches the user's preferences.

At step 500, system 10 may receive information that is present in an environment. For example, external devices 34 in an environment may continuously transmit information in the form of an infrared transmission or other signal. A system 10 may receive all or some of these signals at a camera module 12 including an image sensor 16, which may include a pixel array 18 having pixels that generate electrical signals in response to the received transmissions.

At step 502, system 10 may process the electrical signals generated by pixel array 18 of image sensor 16 in response to the infrared light (or other signals) received by camera module 12. For example, storage and processing circuitry 30 may receive the signals from camera module 12, and may process the signals to determine the type of information that they contain. Storage and processing circuitry 30 may then compare the type of information contained in the signals from external devices 34 to user preferences that are stored, for example, in storage and processing circuitry 30. Storage and processing circuitry 30 may then determine which information is relevant to the user based on the information that is received and user preferences. If the received information matches user preference information, system 10 may proceed to step 504. If the received information does not match user preference information, system 10 may return to step 500 and continue receiving information. This, however, is merely illustrative. System 10 may continue to receive information regardless of whether or not the received information matches user preference information. In one illustrative embodiment, storage and processing circuitry 30 may sort the received information based on user preferences to determine which information to present to a user, or to determine a manner in which to present the information that is relevant to the preferences of the user (e.g., storage and processing circuitry 30 may sort restaurant information into an ordered list of restaurants most relevant to a user's preferences based on the type of food served at each restaurant, etc.).

At step 504, system 10 may display the processed information to the user based on user preferences. For example, system 10 may display only that information received in step 502 that was determined to be relevant to the user based on user preference information. The relevant information may be presented to a user using an input/output device 28 such as a display. The user may then receive the presented information and act based on the information (e.g., the user may select a restaurant based on the sorted list provided by storage and processing circuitry). In this way, a user may only be presented with information that is relevant to their interests or preferences, without transmitting any of their preferences outside of system 10.

Figure 6:
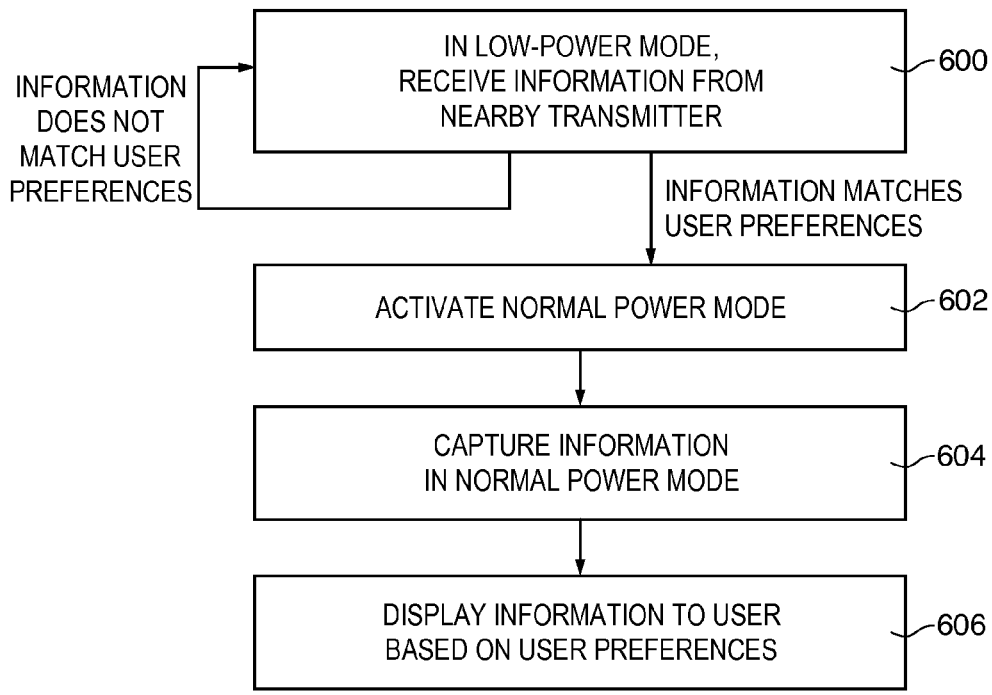
FIG. 6 is a flow chart of illustrative steps that may be performed by an electronic device having an image sensor that may operate in a low power mode and a normal power mode based on the information that is received by the image sensor in accordance with an embodiment of the present invention.

FIG. 6 is a flow chart of illustrative steps that may be performed by a system 10 of FIG. 1 that is operable in a low-power mode and a normal-power mode. A system 10 may perform the illustrative steps of FIG. 6 while operating in a low-power mode, and may activate full-power mode in response to detecting information that is relevant to a user's preferences.

At step 600, system 10 may be active in low-power mode. In one illustrative example, a system 10 in low power mode may only operate some components of a camera module 12 in a fully active state. For example, in a system 10 operating in low-power mode, a portion of image sensor 16 may not be active. For example, only a portion of the pixels in pixel array 18 may be active while system 10 is in low-power mode. The active pixels in pixel array 10 may be pixels that are configured to receive signals such as signals transmitted by an external device 34 (e.g., the active pixels may be a subset of infrared-sensitive pixels), or may be a specific section or spatial arrangement of pixels, or may be a subset of pixels that are configured to detect a certain characteristic or characteristics of light. In one suitable example, system 10 may include a camera module 12 and one or more additional camera modules 14. When operating in low-power mode, one or more of camera modules 12 and/or 14 may be inactive (i.e., may not be provided with power). A camera module 12 and/or 14 that is provided with power may be a camera module 12/14 that contains pixels configured to detect a certain characteristic of light (e.g., light having a wavelength in the infrared spectrum). Camera modules 12 and/or 14 that are not active may be camera modules 12 and/or 14 that are configured to detect light having a different characteristic of light (e.g., light in the visible spectrum). This, however, is merely illustrative. Any combination of camera modules (e.g., camera module 12 and additional camera modules 14) having any combination of pixel arrays 18 with pixels configured to detect any suitable characteristics of light may be active or inactive when system 10 is operating in a low-power mode or in a normal power mode.

In an arrangement in which system 10 is operating in low power mode, system 10 may receive a signal (at, for example, the pixels in pixel array 18 that are active). Upon receiving such a signal, system 10 may process the signal to determine if the information contained in the signal is relevant to the user's preferences (as described above in connection with FIG. 5, for example). If the information is not relevant to the user's preferences, system 10 may remain in low power mode and return to step 600.

If the information received by system 10 is relevant to a user's preferences, system 10 may proceed to step 602, during which system 10 activates a normal power mode. In normal power mode, system 10 may fully activate components such as camera module 12. For example, upon receiving a signal that matches a user's preferences, system 10 may provide power to all pixels in pixel array 18, which may include pixels configured to detect a different characteristic of light that is received at pixel array 18 than those pixels that were active during low-power mode. For example, in normal power mode, system 10 may provide power to pixels configured to detect visible light and generate an image in response to visible light. A system 10 in full power mode may receive more signals and may be capable of performing more processing than a system 10 in low-power mode. A system 10 in normal power mode may provide power to an additional camera module 14 that is not provided with power when the system 10 is in low-power mode.

At step 604, a system 10 in normal power mode may capture information. The information capture process of step 604 may involve transmitting user information and receiving only matching information (as described above in connection with FIG. 4), and/or may involve receiving all signals in an environment and processing the signals to determine those which are relevant to a user's interests (as described above in connection with FIG. 5). System 10 may use any combination of receiving and transmitting information in normal power mode in order to capture and present information that is relevant to a user.

At step 606, information that is relevant to a user may be presented to a user. Relevant information may be determined based on processing that occurs in step 604. For example, storage and processing circuitry 30 may determine the information that is most relevant to the user, and present that information to a user at step 606. In this way, a user may receive only that information which is relevant to user preferences. Because system 10 and at least a portion of the components included therein are only active when information that is relevant to a user is present in an environment, a user may receive only that information which is relevant to his or her preferences without expending excess power and processing resources (to power and use processing equipment of system 10 when information that is relevant to a user is not present in the environment, for example).

Figure 7:
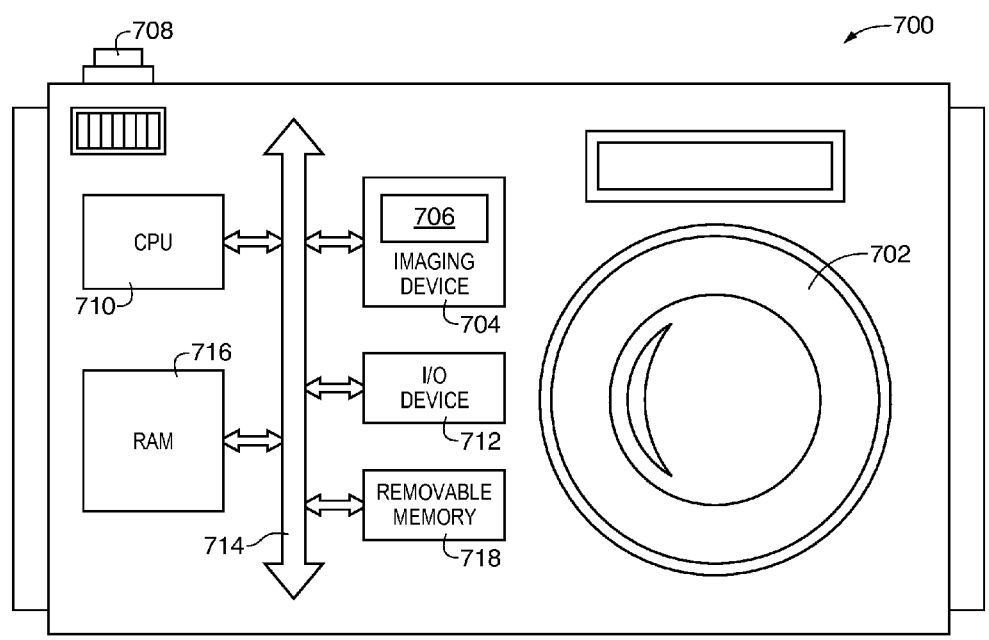
FIG. 7 is a block diagram of a processor system that may employ the embodiments of FIGS. 1-6 in accordance with an embodiment of the present invention.

FIG. 7 shows in simplified form a typical processor system 700, such as a digital camera, which includes an imaging device such as imaging device 704 (e.g., an imaging system that may include a camera module 12 having an image sensor 16 and image processing circuitry 22 configured to receive and process signals in an environment). Imaging device 704 may further include a pixel array 706, which may include a pixel array 18. Processor system 700 is exemplary of a system having digital circuits that could include imaging device 704. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 700, which may be a digital still or video camera system, may include a lens such as lens 702 for focusing an image onto a pixel array such as pixel array 706

(which may include a pixel array 18) when shutter release button 708 is pressed. Processor system 700 may include a central processing unit such as central processing unit (CPU) 710. CPU 710 may be a microprocessor that controls camera functions and one or more image flow functions and communicates with one or more input/output (I/O) devices 712 (such as, for example, input/output devices 28 including a transmitter 32 and/or a display) over a bus such as bus 714. Imaging device 704 may also communicate with CPU 710 over bus 714. Processor system 700 may include random access memory (RAM) 716 and removable memory 718. Removable memory 718 may include flash memory that communicates with CPU 710 over bus 714. Imaging device 704 may be combined with CPU 710, with or without memory storage, on a single integrated circuit or on a different chip. Although bus 714 is illustrated as a single bus, it may be one or more buses or bridges or other communication paths used to interconnect the system components.

A system for receiving and processing signals may include an image sensor including a pixel array having a plurality of pixels that receives light having a light characteristic and that generates electrical signals that represent the light characteristic. The electrical signals may represent additional information encoded in the light characteristic. Such a system may include processing circuitry that processes the electrical signals generated by the pixel array to decode the encoded information and that compares the decoded information to user preference information. Such a system may include an output device that generates an output in response to the processing circuitry comparing the decoded information to the user preference information.

If desired, the decoded information may be compared to the user preference information to determine whether the decoded information matches the user preference information. The processing circuitry may transmit a signal to the output device indicating that the decoded information matches the user preference information, and the output device may generate an output based on the signal. The output device may include a display and/or an audio output device. The output generated by the output device may include an image that is presented to the user on the display and/or an audio signal that is presented to the user using the audio output device. The output device may include a wireless transmitter. The output generated by the output device may include a wireless transmission including user preference information.

If desired, the encoded information may be encoded in a first light characteristic of the light, and the pixel array may include a first set of pixels that generate electrical signals in response to the first light characteristic of the light. The pixel array may include a second set of pixels that detect a second light characteristic of the light. The first light characteristic may be different than the second light characteristic.

If desired, the system may include an additional pixel array that receives the light. The pixel array may generate the electrical signals in response to a first light characteristic of the light, and the additional pixel array may detect a second light characteristic of the light that is different than the first light characteristic. The encoded information may be encoded in the first light characteristic of the light, and the electrical signals generated by the pixel array may represent the first light characteristic and the encoded information.

If desired, a first portion of the plurality of pixels may receive power during a first time period and a second portion of the plurality of pixels may not receive power during the first time period. The second portion of the plurality of pixels may receive power during a second time period that is different than the first time period in response to determining that the decoded information matches the user preference information.

A method of receiving and processing information to be presented to a user may include receiving light with an image sensor that captures an image that includes an information component. The captured image may include image data generated in response to the received light and information data generated in response to the information component. Processing circuitry may process the information data to determine a characteristic of the information component included in the light. The characteristic of the information component may be compared to user preference information to determine whether the characteristic matches the user preference information.

If desired, an output device may generate an output in response to determining that the characteristic matches the user preference information. The output may be a visual representation of the information component that is presented to the user. Generating the output may include transmitting a signal that includes user preference information.

If desired, a power mode of the image sensor may be changed in response to determining that the characteristic matches the user preference information. The image sensor may operate in a low-power mode, and changing the power mode may include changing from the low-power mode to a normal power mode. Changing from the low-power mode to the normal power mode may include providing power to additional pixels in the image sensor that do not receive power when the image sensor operates in the low-power mode.

A method of seeking and capturing information that is presented to a user may include transmitting user preference information with a transmitter, receiving a response signal with encoded information that is relevant to the transmitted user preference information with an image sensor, decoding the information that is relevant to the transmitted user preference information with processing circuitry, and presenting the decoded information to the user with an output device.

If desired, the response signal received by the image sensor may include only the information that is relevant to the preferences of the user. A plurality of response signals may be processed by decoding the information that is relevant to the preferences of the user. Each response signal may include relevant information. The relevant information included in each response signal may be sorted based on the preferences of the user. Sorting the relevant information may include generating an ordered list of the relevant information included in each response signal based on the preferences of the user. The ordered list of the relevant information included in each response signal may be presented to the user using the output device. Relevant information included in one of the plurality of response signals may be selected as most relevant information based on the preferences of the user. If desired, only the most relevant information may be presented to the user using the output device.

The foregoing is merely illustrative of the principles of this invention and various modifications can be made by those skilled in the art without departing from the scope and spirit of the invention. The foregoing embodiments may be implemented individually or in any combination.

What is claimed is:
1. A system for receiving and processing signals, the system comprising:

an image sensor including a pixel array with a plurality of pixels that receives light having a light characteristic, wherein the pixel array generates electrical signals that represent the light characteristic and additional information encoded in the light characteristic in response to the received light, and wherein a first portion of the plurality of pixels receives power during a first time period and a second portion of the plurality of pixels does not receive power during the first time period;

processing circuitry that processes the electrical signals generated by the pixel array to decode the encoded information, that compares the decoded information to user preference information, and that sorts the decoded information to generate a sorted list of options based on the user preference information, wherein the decoded information is compared to the user preference information to determine whether the decoded information matches the user preference information, and wherein the second portion of the plurality of pixels receives power during a second time period that is different than the first time period in response to determining that the decoded information matches the user preference information; and an output device that generates an output in response to the processing circuitry by comparing the decoded information to the user preference information, wherein the output comprises a plurality of the options from the sorted list.

2. The system defined in claim 1, wherein the processing circuitry transmits a signal to the output device indicating that the decoded information matches the user preference information and wherein the output device generates the output based on the signal.

3. The system defined in claim 2, wherein the output device comprises at least one of a display and an audio output device, and wherein the output generated by the output device includes at least one of an image that is presented to the user on the display and an audio signal that is presented to the user using the audio output device.

4. The system defined in claim 2, wherein the output device comprises a wireless transmitter, and wherein the output generated by the output device includes a wireless transmission including the user preference information.

5. The system defined in claim 1, wherein the encoded information is encoded in a first light characteristic of the light, and wherein the pixel array includes a first set of pixels that generate the electrical signals in response to the first light characteristic of the light that is received at the pixel array.

6. The system defined in claim 5, wherein the pixel array includes a second set of pixels that detect a second light characteristic of the light that is received at the pixel array, wherein the first light characteristic is different than the second light characteristic.

7. The system defined in claim 1, further comprising:
an additional pixel array that receives the light having the light characteristic, wherein the pixel array generates the electrical signals in response to a first light characteristic of the light, and wherein the additional pixel array detects a second light characteristic of the light that is different than the first light characteristic.

8. The system defined in claim 7, wherein the encoded information is encoded in the first light characteristic of the light, and wherein the electrical signals generated by the pixel array represent the first light characteristic and the encoded information.

9. A method of receiving and processing information to be presented to a user, the method comprising:
receiving light with an image sensor that captures an image that includes an information component, wherein the captured image includes image data generated in response to the received light and information data generated in response to the information component;

with processing circuitry, processing the information data to determine a characteristic of the information component included in the light;

comparing the characteristic of the information component to user preference information to determine whether the characteristic matches the user preference information; and in response to determining that the characteristic matches the user preference information, changing a power mode of the image sensor.

10. The method defined in claim 9, further comprising:
with an output device, generating an output in response to determining that the characteristic matches the user preference information, wherein generating the output comprises presenting a visual representation of the information component to the user.

11. The method defined in claim 10, wherein generating the output comprises transmitting a signal that includes the user preference information.

12. The method defined in claim 9, wherein the image sensor operates in a low-power mode, and wherein changing the power mode comprises changing from the low-power mode to a normal power mode, wherein changing from the low-power mode to the normal power mode comprises providing power to additional pixels in the image sensor that do not receive power when the image sensor operates in the low-power mode.

13. A method of seeking and capturing information that is presented to a user, the method comprising:
with a transmitter, transmitting user preference information;

with an image sensor, receiving a plurality of response signals with encoded information that is relevant to the transmitted user preference information, wherein each response signal received by the image sensor includes only the information that is relevant to the preferences of the user;

with processing circuitry, processing the plurality of response signals by decoding the information that is relevant to the preferences of the user, wherein each response signal includes relevant information;

sorting the relevant information included in each response signal based on the preferences of the user;

selecting the relevant information included in one of the plurality of response signals as most relevant information based on the preferences of the user; and with an output device, presenting only the most relevant information to the user.

14. The method defined claim 13, wherein sorting the relevant information comprises generating an ordered list of the relevant information included in each response signal based on the preferences of the user, and wherein the ordered list of the relevant information included in each response signal is presented to the user using the output device.

15. The system defined in claim 1, wherein the processing circuitry performs further processing to generate details for a given one of the plurality options, wherein the details for the given one of the plurality of options are presented to a user in the output.

* * * * *